(12) United States Patent
Brown et al.

(10) Patent No.: US 10,572,900 B2
(45) Date of Patent: Feb. 25, 2020

(54) MOBILE DEVICE DETECTION AND IDENTIFICATION WITH A DISTRIBUTED TRACKING AND PROFILING FRAMEWORK

(71) Applicant: Bank of America Corporation, Charlotte, NC (US)

(72) Inventors: Robert Justin Brown, Santa Monica, CA (US); Craig A. Froelich, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 1141 days.

(21) Appl. No.: 13/965,690

(22) Filed: Aug. 13, 2013

(65) Prior Publication Data

US 2015/0051976 A1    Feb. 19, 2015

(51) Int. Cl.
  *G06Q 30/02* (2012.01)
(52) U.S. Cl.
  CPC ..... *G06Q 30/0261* (2013.01); *G06Q 30/0267* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 2007/0288310 | A1* | 12/2007 | Boos | G06Q 30/02 705/14.38 |
| 2008/0268868 | A1* | 10/2008 | Maitland | G06Q 30/02 455/456.1 |
| 2010/0332324 | A1* | 12/2010 | Khosravy | G06Q 30/00 705/14.53 |
| 2011/0246284 | A1* | 10/2011 | Chaikin | G06Q 20/105 705/14.38 |
| 2012/0244885 | A1* | 9/2012 | Hefetz | G06Q 20/32 455/456.2 |
| 2012/0262112 | A1* | 10/2012 | Ross | H02J 7/0042 320/109 |
| 2013/0304536 | A1* | 11/2013 | Hamachi | G06Q 30/0201 705/7.29 |
| 2014/0244357 | A1* | 8/2014 | Patterson | G06Q 30/0203 705/7.32 |

OTHER PUBLICATIONS

Private Investigator Advice HQ: How Long Does a Private Investigator Follow Someone? Why Do They Stop?*

(Continued)

*Primary Examiner* — John Van Bramer
*Assistant Examiner* — Brendon Beheshti
(74) *Attorney, Agent, or Firm* — Banner & Witcoff, Ltd.; Michael A. Springs (57) ABSTRACT

Systems, methods and computer-readable media for detecting a mobile device and identifying a user of the device are provided. A wireless signature or other unique identifier of a device may be detected. User information for the device may be obtained from a secondary source independent of the mobile device. Once a user is identified, user information may be retrieved and the user identity and user information may be associated with a mobile device. When the mobile device is then detected at a later time (e.g., after the information has been associated with the device), one or more offers may be generated based on the associated information and/or the location of the device at the time it is detected.

14 Claims, 6 Drawing Sheets

(56) References Cited

OTHER PUBLICATIONS

Glenn Wilkinson, Snoopy: A distributed tracking and profiling framework. (Sep. 25, 2012). (Year: 2012).*
GitHub—sensepost/Snoopy: Snoopy: A distributed tracking and data interception framework. (Dec. 7, 2012)—i.e. the code for a 'detection device.' (Year: 2012).*
Private Investigator Advice HQ: How Long Does a Private Investigator Follow Someone? Why Do They Stop? (Year: 2018).*

* cited by examiner

MOBILE DEVICE DETECTION AND IDENTIFICATION WITH A DISTRIBUTED TRACKING AND PROFILING FRAMEWORK

BACKGROUND

Wireless networks are found nearly everywhere. For instance, restaurants, stores, coffee shops, airports, office buildings, and the like, all may have a wireless network. Today, people are using mobile devices such as smartphones and tablet computers on a daily basis. These devices generally include wireless network connectivity and can detecting wireless access points. Although these mobile devices may be capable of connecting to the wireless networks found in various locations, detection of the wireless signal or unique identifier of the device by the access point does not provide any additional benefit to the user. For instance, the wireless access point does not provide any sort of enhancement to the user's experience.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for detecting a mobile device and identifying a user of the device. A wireless signature or other unique identifier of a mobile device may be detected. In some examples, user identifying information may also be determined. The user identification information may be obtained from a secondary source, independent of the mobile device. Once a user is identified, user information may be retrieved and the user identity and user information may be associated with a mobile device. When the mobile device is then detected at a later time (e.g., after the information has been associated with the device), one or more offers may be generated based on the associated information and/or the location of the device at the time it is detected.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Figure 1:
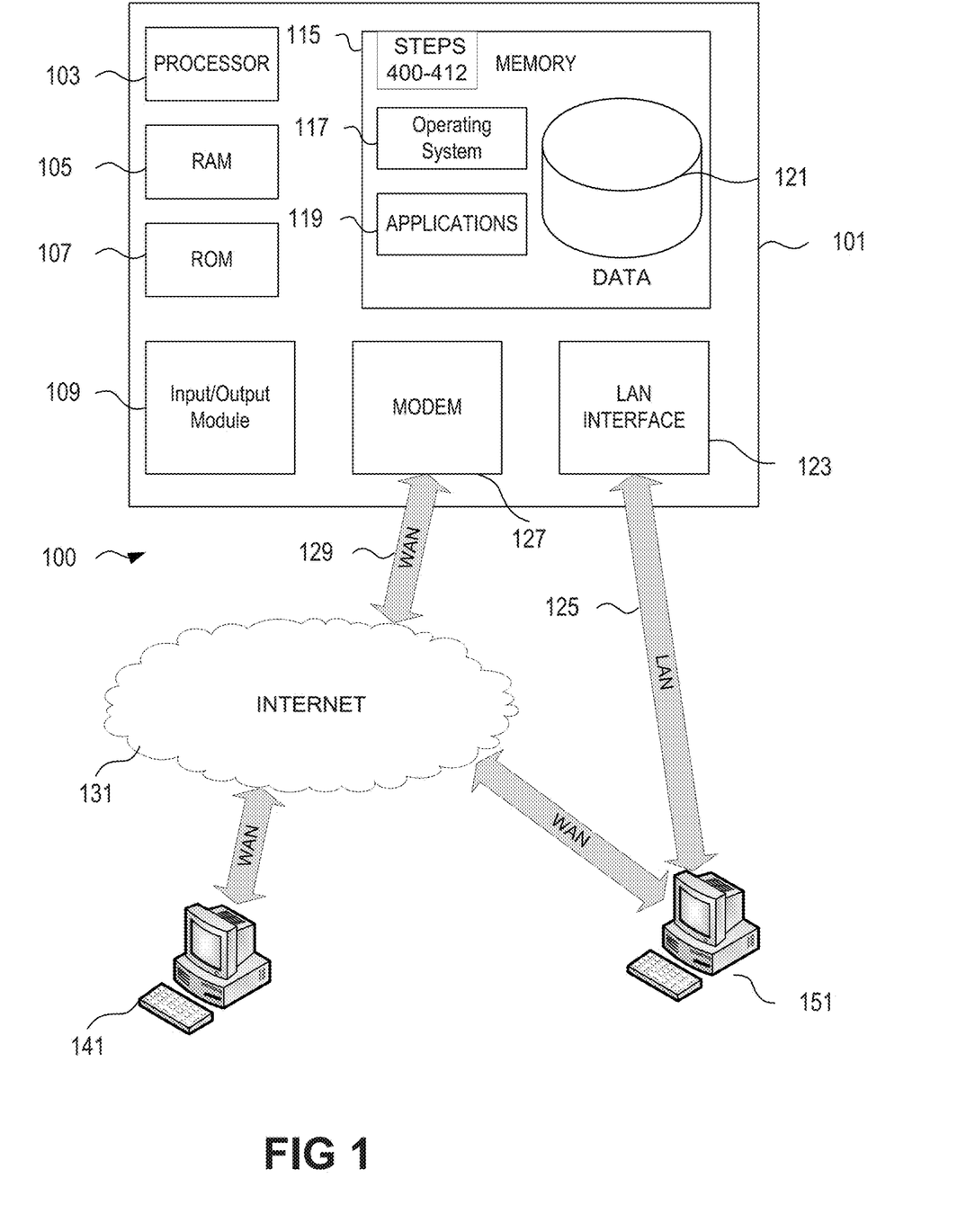
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
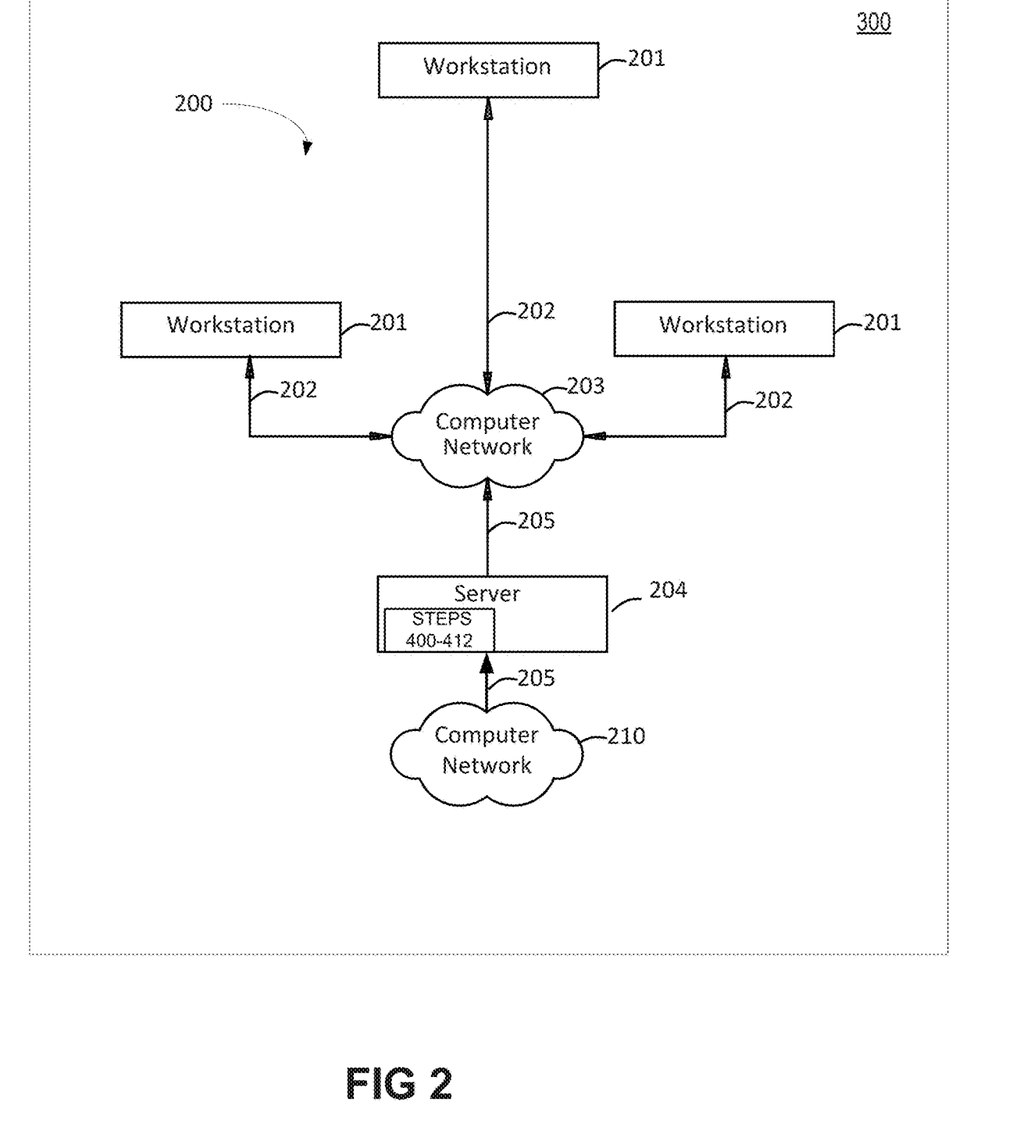
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
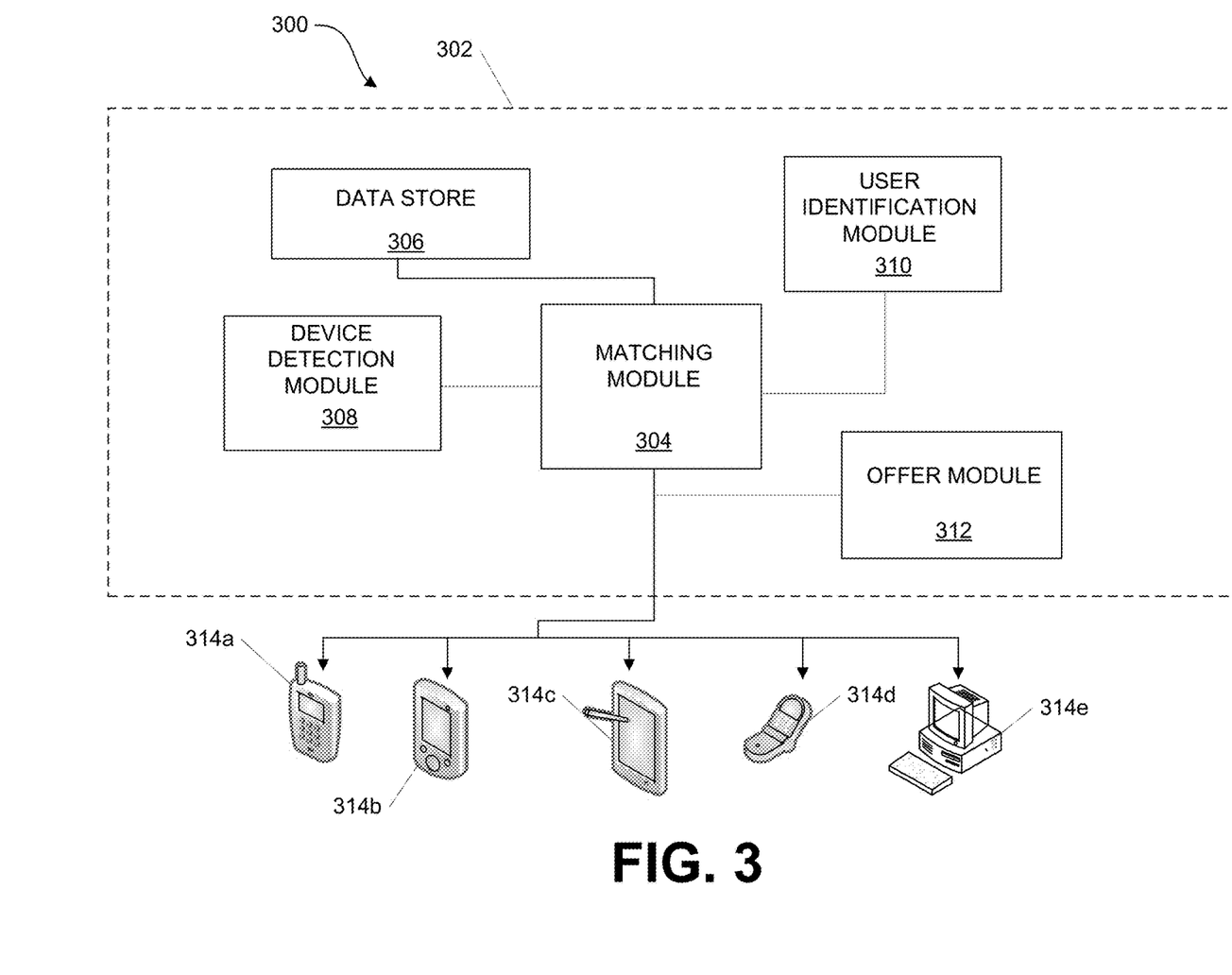
FIG. 3 illustrates an example mobile device detection and identification system according to one or more aspects described herein.

FIG. 3 illustrates one example mobile device detection and identification system 300 according to one or more aspects described herein. In some examples, the mobile device detection and identification system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the virtual position display and indication system to use within a financial institution. Rather, the system may be implemented by various other types of entities.

The mobile device detection and identification system 300 may include one or more modules that may include hardware and/or software configured to perform various functions within the system 300. For instance, the system, 300 may include a mobile device detection module 308. The mobile device detection module may be configured to detect a signal, such as a wireless signature or other unique identifier of a device, to detect a mobile device. In some examples, the mobile device detection module 308 may recognize a signal that it has previously detected. For example, in a similar arrangement, a user may connect to or attempt to connect to a wireless network (e.g., public wireless network, private wireless network, and the like) in order to access a network, such as the Internet. Accordingly, the device may, upon returning to the location at which the connection was made, remember or recognize a wireless signature or other unique identifier of the mobile device. Similarly, as discussed herein, the mobile device detection module 308 may detect a wireless signature or other unique identifier of a mobile device within a predetermined proximity of the module 308 and may, in some examples, store the unique identifier in order to remember or recognize the wireless signature or other unique identifier of the mobile device any subsequent times the device is within the predefined proximity.

The mobile device detection and identification system 300 may further include a user identification module 310. The user identification module 310 may be connected to or in communication with the mobile device detection module 308 in order to identify a user of a mobile device that has been detected. For example, the wireless signature or other unique identifier detected, such as by the mobile device detection module 308, may be compared or matched with user information in order to identify the user associated with the detected mobile device. For instance, the wireless signature or other unique identifier may be detected at a location in which a user is providing additional identifying information. Accordingly, the identifying information of the user may be matched with the unique identifier of the mobile device.

In some examples, the matching operation may be conducted by a matching module 304. The matching module may associate the user identifying information from the user identification module 310 with the unique identifier of the mobile device detected by the mobile device detection module 308. Once an association is made, additional user information may be retrieved by the matching module 304, such as from a data store 306. The additional user information may be information provided by the user to the entity (e.g., upon opening an account, making a purchase, applying for a loan, and the like) or may be publicly available information. In some examples, a plurality of data stores may be used to store the user information.

The additional user information may include, in some arrangements, information about spending habits of a user, types of banking tools used, address, stores frequented, types of purchases made, and the like. Some information retrieved from the data store 306 may be determined based on services provided by the entity to the user. For instance, if the entity implementing the system is a financial institution, such as a bank, a user may have a credit or debit card with the bank, a checking account, a savings account, and the like. Historical information regarding the home address of the user, location of stores frequented, purchases made, and the like, may be retrieved from the data store 306 by the matching module 304 and may be associated with the unique identifier and the user identification information.

The system 300 may further include offer module 312. Offer module 312 may identify or generate one or more offers for a user based on the detecting mobile device and/or location of the detected mobile device, the user identification information and/or the user information. For instance, once the device is detected and the unique identifier is associated with the user and the user information (e.g., by the matching module 304), when the device is again (e.g., at a later time) detected, the offer module may generate an offer for the user based on the associated information, the location at which the device was detected, and the like.

Various computing devices 314a-314e may be connected to or in communication with the mobile device detection and identification system 300. For instance, one or more mobile devices, such as smartphone 314a, personal digital assistant 314b, tablet computer 314c, or cell phone 314d may be detected by the system 300. Additionally or alternatively, any of the computing devices shown, including terminal 314e, may be used to implement, modify, control, and the like, the system. For instance, additional offer information may be input via one or more computing device 314a-314e, one or more matching operations may be modified and/or user information may be input via computing devices 314a-314e. Various other types of computing devices (e.g., laptop computers) may be detected by or used with the system 300 without departing from the invention.

Figure 4:
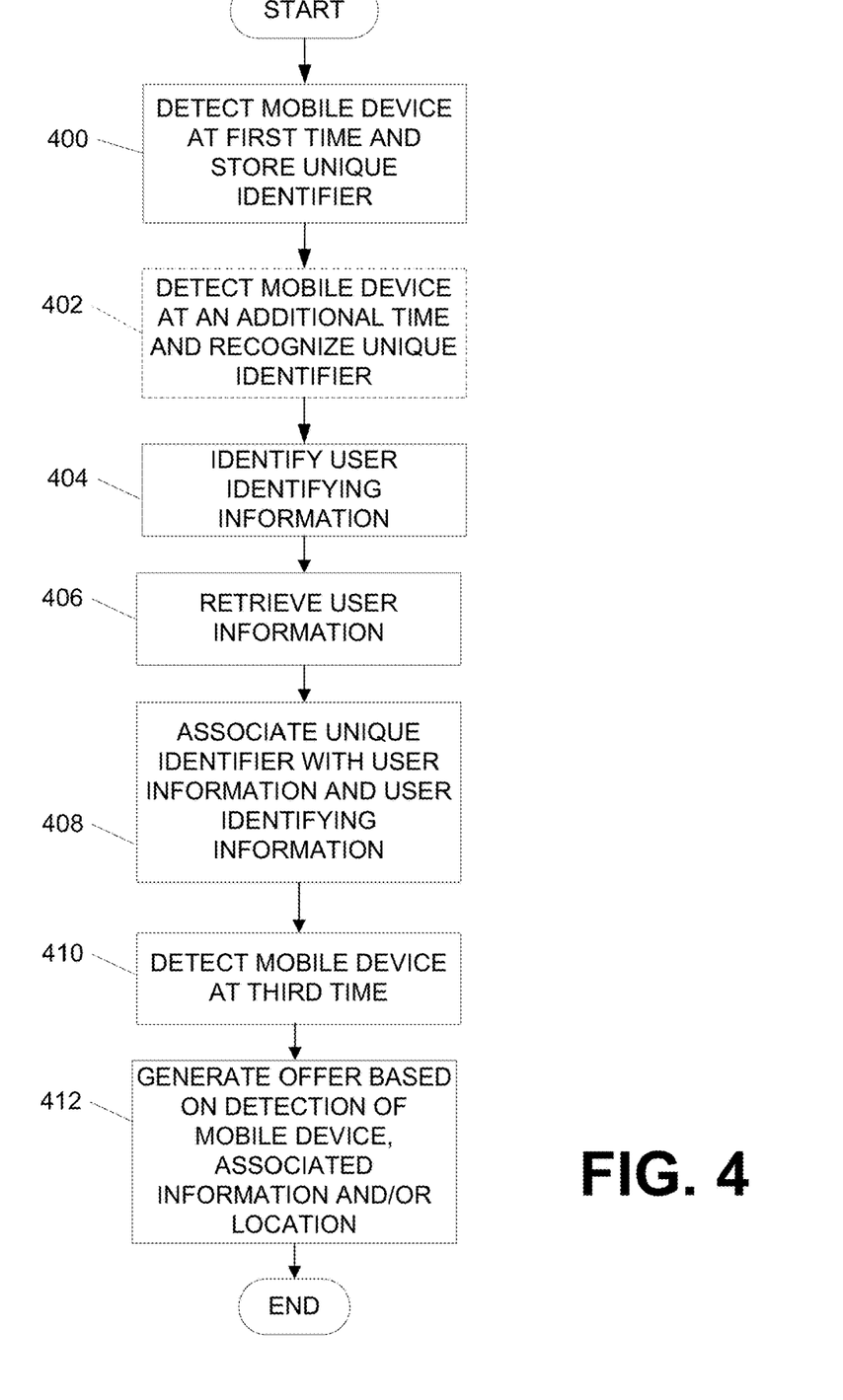
FIG. 4 is an example method of detecting a mobile device and identifying a user associated with the device according to one or more aspects described herein.

FIG. 4 illustrates one example method of mobile device detection and identification according to one or more aspects described herein. In step 400, a mobile device is detected and a wireless signature or other unique identifier is stored. In some examples, the mobile device may be detected by a detecting device that may include a computing device acting as a wireless access point (e.g., receiving a wireless signature from a device as if the device was attempting to connect to the wireless access point. However, no connection of the mobile device to the detecting device would be made). In some examples, the detecting device may include a distributed tracking framework. The detecting device may be arranged in a variety of locations. For instance, if the entity implementing the system is a financial institution, such as a bank, the detecting device may be arranged within one or more bank branches, one or more Automated Teller Machines (ATMs), and the like. In other instances, the detecting device may be arranged within an office or building of an entity to detect devices and/or determine locations of employees, and the like. In still other examples, the detecting device may be used in retail entities (e.g., stores, restaurants, and the like) to detect a device associated with a customer.

In optional step 402, the unique identifier of the mobile device may be detected a subsequent time. In some arrangements, the unique identifier may be stored and the process may move directed to step 404. In other arrangements, the unique identifier may be stored after an instance of detection and the unique identifier may be detected one or more additional times before step 404 is implemented.

In step 404, user identifying information may be determined. For instance, additional information identifying a user associated with or within a predefined proximity of the detected mobile device may be determined. In some examples, the user identifying information may be from a source other than the mobile device. For example, a user may be conducting a transaction at an ATM. The ATM may include a detecting device and thus, the unique identifier of the mobile device may be detected and the identity of the user may be known via the ATM card being used, personal identification number (PIN), and the like. In some examples, a mobile device may be detected at an ATM two or more times and the signal stored to confirm that the same unique identifier is associated with the same user of the ATM each time. This may provide a higher confidence level of the identity of the user of the detected mobile device.

In another example, a building may require a radio frequency identification tag to gain access to the building. A detecting device may be arranged near an access point of the building. Accordingly, the detecting device may detect the unique identifier of the mobile device and an RFID tag associated with a known user may be detected at the same time (e.g., within a predefined time period) or within a predefined proximity. Thus, the identity of the user may be known from the RFID tag and associated with the detected mobile device. In some examples, the unique identifier of the mobile device may be detected multiple times with the RFID tag in order to improve confidence level in the identity of the user.

The examples of identifying a user described above are merely some example arrangements. Various other methods of identifying a user or potential user of a device may be used without departing from the invention.

In step 406, user information associated with the identified user may be retrieved. For instance, a name, address, and the like may be retrieved, such as from a data store. In some examples, the entity implementing the system may be a financial institution, such as a bank. Accordingly, the financial institution may store various information about the user, such as spending history, income information, retail establishments visited (e.g., retailers or restaurants at which a debit or credit card associated with the user is used), ATM or bank branches visited, and the like. In some arrangements, the user information may only be accessed by an entity (implementing the system and/or method) to which the information was provided by the user.

The user information may be retrieved in step 406 and, in step 408, may be associated with the user identifying information and the unique identifier of the mobile device. For instance, the information may be matched or associated such that, upon a subsequent detection of the unique identifier of the mobile device, user information may be identified and accessed. In some examples, the unique identifier of the mobile device may be detected in a store that the user hasn't visited before. However, because the unique identifier is associated with the user, upon recognition of the unique identifier in the store, the user may be identified. In another example, a user may enter a bank branch and the unique identifier of the mobile device may be detected. Without any further information, input, or the like, the user associated with that mobile device may be identified.

In step 410, a subsequent detection of the unique identifier may occur. The subsequent detection may occur later in time than the detection in step 400 and/or the optional additional detections in step 402. In step 412, one or more offers or proposed offers may be generated for the user. The proposed offer may be generated based the user information associated with the unique identifier and/or a location at which the mobile device was detected. For instance, in the example in which the user may enter a retail establishment that he or she has not visited before, upon detection of the mobile device, the user may be identified and may be greeted by name at the store. The personal greeting may be the offer generated by the system. That is, the system may user the location of the user, the information indicating that there is no record of the user visiting that store previously, and may generate an offer to greet the user and/or provide additional information to the user about the establishment since there is no indication the user has visited that establishment before.

In another example, a user may enter a bank branch. Upon entering the branch having a detecting device, the user may be identified and one or more options or offers may be generated for the user. For instance, the system may determine, from the retrieved user information, that the user is carrying a balance on a credit card. Accordingly, the user may be offered a low interest rate card or a promotional rate. In another example, the system may identify the user and the location of the user based on the detected mobile device and may generate a coupon or other incentive that may be used at a nearby restaurant, store, and the like.

Figure 5:
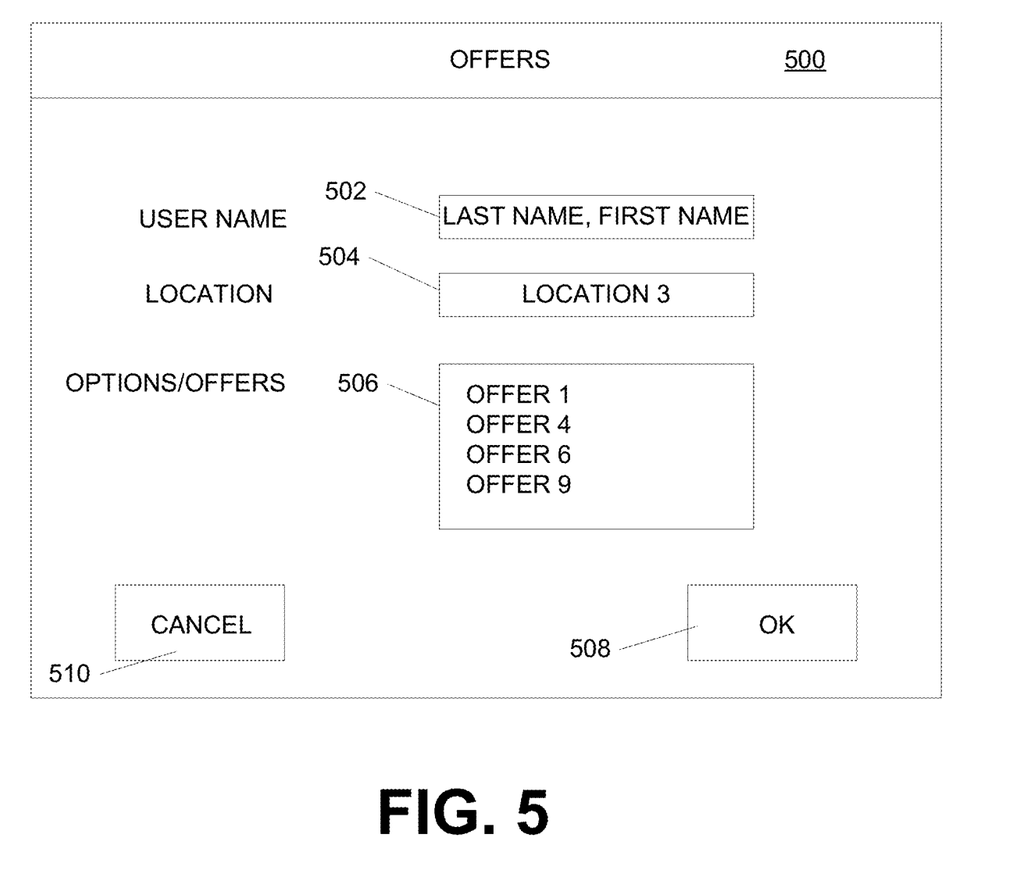
FIG. 5 illustrates example user interface showing the generated offers according to one or more aspects described herein.

FIG. 5 illustrates one example user interface that may be used to provide offers to one or more associates that may then convey or transmit the offer to the user. As used herein, the term offer may include one or more of various types of benefits to the user that may include, for example, a particular greeting for the user, a promotional offer, a coupon, a discount, a new service, a new product, and the like. Various other types of offers may be generated and provided by the system without departing from the invention.

The user interface 500 includes field 502 which identifies the name of the user. That is, the system may have already detected the mobile device, identified the user, retrieved the user information, detected the location of the mobile device associated with the user and generated one or more offers based on the location and the associated information. Field 504 may identify a location at which the mobile device associated with the user was detected. For instance, the location may include identification of a particular bank branch, ATM, retail establishment, office location, and the like.

Field 506 may identify one or more offers that have been generated by the system and are intended to be conveyed to the user. In some examples, the user interface 500 may be viewed by an associate (e.g., sales associate, bank teller, and the like) in response to detection of the mobile device at the location. Accordingly, the associate may present the one or more offers generated and shown in field 506 to the user for consideration. Acceptance of one or more offers may prompt additional user interfaces that may require additional user input by the associate and/or the user. The offers are shown generically as offers 1, 4, 6, and 9. However, each offer shown may represent a different offer available to the user based on the retrieved user information and/or detected location. For instance, one or more offers may be for a new product or service associated with the location. In another example, one or more offers may be a promotion associated with the entity (e.g., a promotional interest rate on a loan if the entity is a financial institution). In still other examples, one or more offers may be a discount or coupon associated with an entity or establishment within a predefined proximity of the detected location (e.g., a nearby restaurant or store). Various other types of offers and/or combinations of offers may be generated by the system.

In one example, the user interface 500 may be displayed to the associate in response to detection of the mobile device. Accordingly, the associate may proactively approach the user and, in some examples, greet the user by name based on the information provided in user interface 500. Additionally or alternatively, the associate may approach the user with an offer that may anticipate the needs of the user. For instance, the retrieved user information may indicate that the due date for a loan payment of the user is approaching. Accordingly, one offer may indicate that the user could make the loan payment. The associate may then anticipate the user's needs by inquiring as to whether he or she is at the location to make the payment. This is merely one example of anticipating a user's needs. Various other examples may be used without departing from the invention.

In some examples, the associate may select one or more of the generated offers (e.g., by clicking or double-clicking the offer, and the like). Selection of one or more offers may prompt additional user interfaces for processing the offers. Once the desired selections are made, "OK" option 508 may be selected. Alternatively, if the user would like to clear the generated offers, or return to a previous user interface, "cancel" option 510 may be selected.

Figure 6:
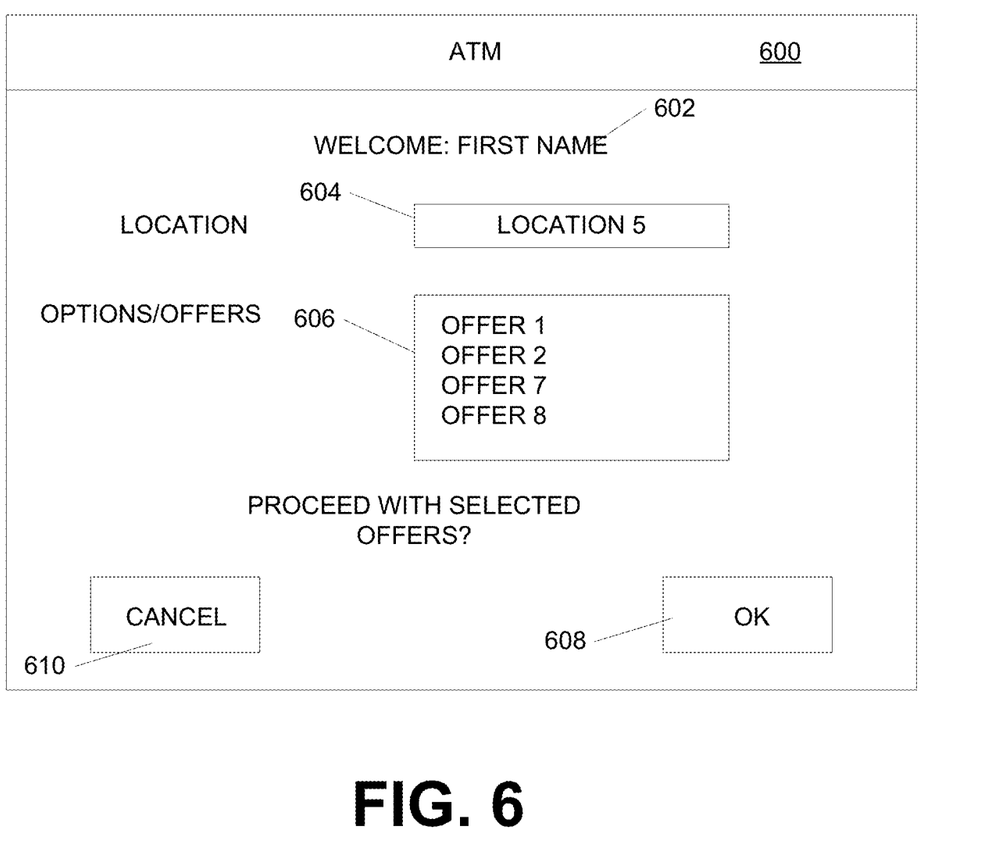
FIG. 6 is another example user interface showing generated offers according to one or more aspects described herein.

FIG. 6 illustrates one example user interface 600 that may present one or more offers generated by the system to the user. For instance, if a mobile device of a user is detected at a location, such as an ATM, the user may be presented with one or more offers generated by the system via the user interface of the ATM. In field 602, the user is greeted by his or her first name. In field 604, a location of the detected mobile device is indicated. For instance, the address or location of the ATM at which the user is conducting the transaction may be indicated. In some arrangements, the address or a nearby intersection of the ATM may be provided as an additional indicator or the proximity to one or more establishments associated with the generated offers.

Field 606 lists a plurality of offers generated by the system. In some examples, the generated offers may be based on the retrieved user information associated with the unique identifier of the mobile device of the user and/or the detected location of the mobile device associated with the user. Offers similar to those discussed above may be provided and the user may select one or more offers to pursue by clicking, double-clicking, and the like, the desired offer(s).

Once any desired selections are made, "ok" option 608 may be selected. Selection of option 608 may prompt additional user interfaces requesting additional information from a user. In some examples, additional follow-up information may be requested of the user. The follow-up information may be provided in person (e.g., at a bank branch, at a retail establishment, and the like) or online (e.g., via an online or mobile banking application, via a website of an establishment, and the like). In some examples, selection of one or more options may prompt a user interface for printing an offer. For instance, if one of the offers generated is a coupon to a nearby restaurant, the ATM may be configured to print the coupon and printing may be confirmed via an additional user interface. In some examples, the coupon may be printed on a back side of a receipt. In some arrangements, an offer involving a coupon may automatically be printed on a reverse or back side of a receipt without requiring any additional user input.

If a user does not desire to proceed with any of the generated offers, "cancel" option 610 may be selected and the user may continue with the transaction, may be returned to a previous user interface or may be closed out of the session.

In addition to the various advantages of the mobile device detection and identification systems and methods discussed above, additional advantages may include providing an improved customer service experience. For instance, by detecting a mobile device and identifying a user of the device, user information may be accessed that may aid in providing a more tailored customer service experience for the user. For instance, understanding the user's spending patterns or history may aid in providing more desirable product or service offerings to the user.

Further, although the above arrangements generally describe detection of a device followed by identification of the user (e.g., from a secondary source of information), in some arrangements, the device may be detected and the wireless signature or other unique identifier may be stored two or more times before the user associated with the device is identified.

Further, once the mobile device is associated with a user, the system may be used for a variety of purposes. For instance, the system may be used in a natural or other disaster in order to determine a location of an individual. For instance, if an earthquake damages a building, a detecting device may be used to locate one or more mobile devices within the building to determine who is in the building and their approximate location (e.g., based on GPS, signal strength, and the like). Additionally or alternatively, individuals not in the building may be identified based on detection of the signal associated with their mobile device at another location outside of the damaged building. For instance, a detecting device a block away from the damaged building may detect the mobile device of a user and, thus, it would be known (or at least safely presumed) that that individual is not within the damaged building.

In still other examples, the system and methods described herein may be used to track wrongdoers. For instance, if a bank branch is robbed, the mobile device may be a device already associated with a user and thus, the user robbing the bank could be identified. Additionally or alternatively, a location of a person suspected of wrongdoing may be determined or tracked if their mobile device has been associated with the user suspected of wrongdoing.

Additionally or alternatively, if a mobile device is associated with a user and the user information associated with the device indicates use of, for instance, ATMs within a particular area, region, proximity of a location, and the like, use of an ATM card to access an ATM outside of that area may indicate potential unauthorized access. Accordingly, the system may decline the transaction, contact the user, and the like, to avoid any unauthorized access to the user's account.

In another example arrangement, the system may be used in conjunction with an awards program offered by an entity. For instance, a user may earn points, obtain coupons or other promotions, and the like, based on locations visited by the user. For instance, if a user accesses an ATM associated with a particular financial institution with which the user has an account (as opposed to an ATM associated with another financial institution), the user may receive points or a promotional offer as a reward for using the ATM.

In yet another example, a mobile device associated with a user may be detected at, for example, an ATM at a particular venue (e.g., a sporting event, arena, and the like). Because the user is accessing the ATM within the venue, the system may provide the user with a coupon for use within the venue.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   detect, by a first detecting device of an automated teller machine (ATM), a signal at a first time, the signal detected at the first time including a wireless signature of a mobile device and the wireless signature being a unique identifier associated with the mobile device, wherein the ATM includes the first detecting device and the first detecting device of the ATM comprises a computing device acting as a wireless access point and includes a distributed tracking and profiling framework;
   detect, by a second detecting device, a signal at a second time subsequent to the first time, the signal detected at the second time including the wireless signature of the mobile device and the wireless signature being the unique identifier associated with the mobile device, the detecting at the second time including recognizing the wireless signature of the mobile device;
   detect, by the second detecting device a radio frequency identification (RFID) tag within a predefined time period of detecting the signal detected at the second time;
   determine, based on the detected RFID tag, identifying information of a user associated with the mobile device;
   match the determined identifying information of the user to the wireless signature of the mobile device, wherein a source of the determined identifying information and the mobile device are physically separate devices;
   repeat the detecting of the wireless signature and the RFID tag, the determining, and the matching to improve a confidence level in an identity of the user;
   retrieve, from a data store and based on the matching, user information associated with the user;
   associate, based on the detecting at the first time and the second time, the identifying information determined from the additional information provided to the ATM and the RFID tag, and the retrieved user information with the wireless signature of the mobile device;
   detect, at a third time after the first time and the second time, a signal, the signal detected at the third time including the wireless signature of the mobile device and the wireless signature being the unique identifier of the mobile device;
   detect, based on data from a global positioning system (GPS), a location of the mobile device at the third time; and
   generate an offer to provide to the user based on the detected location of the mobile device at the third time and the associated identifying information and retrieved user information.

2. The apparatus of claim 1, further including, prior to determining the identifying information of the user, storing the detected unique identifier.

3. The apparatus of claim 1, wherein determining identifying information includes identifying the user based on information from a secondary source.

4. The apparatus of claim 3, wherein the secondary source is a source other than the mobile device.

5. The apparatus of claim 1, wherein the offer includes at least one of a promotion, a discount, a coupon, and an offer for sale.

6. A method, comprising:
   detecting, by a first detecting device of an automated teller machine (ATM), a signal at a first time, the signal detected at the first time including a wireless signature of a mobile device and the wireless signature being a unique identifier associated with the mobile device, wherein the ATM includes the first detecting device and the first detecting device of the ATM comprises a computing device acting as a wireless access point and includes a distributed tracking and profiling framework;
   detecting, by a second detecting device, a signal at a second time subsequent to the first time, the signal detected at the second time including the wireless signature of the mobile device and the wireless signature being the unique identifier associated with the mobile device, the detecting at the second time including recognizing the wireless signature of the mobile device;
   detecting, by the second detecting device a radio frequency identification (RFID) tag within a predefined time period of detecting the signal at the second time;
   determining, by a mobile device detection and identification system and based on the detected RFID tag, identifying information of a user associated with the mobile device;
   matching the determined identifying information of the user to the wireless signature of the mobile device, wherein a source of the determined identifying information and the mobile device are physically separate devices;
   repeating the detecting of the wireless signature and the RFID tag, the determining, and the matching to improve a confidence level in an identity of the user;
   retrieving, from a data store and based on the matching, user information associated with the user;
   associating, by the mobile device detection and identification system and based on the detecting at the first time and the second time, the identifying information determined from the additional information provided to the ATM and the RFID tag, and the retrieved user information with the wireless signature of the mobile device;
   detecting, at a third time after the first time and the second time, a signal, the signal detected at the third time including the wireless signature of the mobile device and the wireless signature being the unique identifier of the mobile device;
   detecting, based on data from a global positioning system (GPS), a location of the mobile device at the third time; and
   generating, by the mobile device detection and identification system, an offer to provide to the user based on the detected location of the mobile device at the third time and the associated identifying information and retrieved user information.

7. The method of claim 6, further including, prior to determining the identifying information of the user, storing the detected unique identifier.

8. The method of claim 6, wherein determining identifying information includes identifying the user based on information from a secondary source.

9. The method of claim 8, wherein the secondary source is a source other than the mobile device.

10. The method of claim 6, wherein the offer includes at least one of a promotion, a discount, a coupon, and an offer for sale.

11. One or more non-transitory computer-readable media having computer-executable instructions stored thereon that, when executed, cause at least one computing device to:
- detect, by a first detecting device of an automated teller machine (ATM), a signal at a first time, the signal detected at the first time including a wireless signature of a mobile device and the wireless signature being a unique identifier associated with the mobile device, wherein the ATM includes the first detecting device and the first detecting device of the ATM comprises a wireless access point and includes a distributed tracking and profiling framework;
- detect, by a second detecting device, a signal at a second time subsequent to the first time, the signal detected at the second time including the wireless signature of the mobile device and the wireless signature being the unique identifier associated with the mobile device, the detecting at the second time including recognizing the wireless signature of the mobile device;
- detect, by the second detecting device a radio frequency identification (RFID) tag within a predefined time period of detecting the signal at the second time;
- determine, based on the detected RFID tag, identifying information of a user associated with the mobile device;
- match the determined identifying information of the user to the wireless signature of the mobile device, wherein a source of the determined identifying information and the mobile device are physically separate devices;
- repeat the detecting of the wireless signature and the RFID tag, the determining, and the matching to improve a confidence level in an identity of the user;
- retrieve, from a data store and based on the matching, user information associated with the user;
- associate, based on the detecting at the first time and the second time, the identifying information determined from the additional information provided to the ATM and the RFID tag, and the retrieved user information with the wireless signature of the mobile device;
- detect, at a third time after the first time and the second time, a signal, the signal detected at the third time including the wireless signature of the mobile device and the wireless signature being the unique identifier of the mobile device;
- detect, based on data from a global positioning system (GPS), a location of the mobile device at the third time; and
- generate an offer to provide to the user based on the detected location of the mobile device at the third time and the associated identifying information and retrieved user information.

12. The one or more non-transitory computer-readable media of claim 11, further including, prior to determining the identifying information of the user, storing the detected unique identifier.

13. The one or more non-transitory computer-readable media of claim 11, wherein determining identifying information includes identifying the user based on information from a secondary source.

14. The one or more non-transitory computer-readable media of claim 13, wherein the secondary source is a source other than the mobile device.

* * * * *